United States Patent [19]
Jones

[11] Patent Number: 5,928,347
[45] Date of Patent: Jul. 27, 1999

[54] UNIVERSAL MEMORY CARD INTERFACE APPARATUS

[75] Inventor: Alan E. J. Jones, Wilkingham, United Kingdom

[73] Assignee: Shuttle Technology Group Ltd., United Kingdom

[21] Appl. No.: 08/972,751

[22] Filed: Nov. 18, 1997

[51] Int. Cl.$^6$ .................................................. G06F 13/00
[52] U.S. Cl. .......................... 710/129; 710/100; 710/101; 710/63
[58] Field of Search .................................. 395/309, 280, 395/281, 282, 284, 882; 710/129, 100, 101, 102, 104, 63

[56] References Cited

U.S. PATENT DOCUMENTS

| | | | |
|---|---|---|---|
| 5,628,028 | 5/1997 | Michelson | 710/102 |
| 5,630,174 | 5/1997 | Stones, III et al. | 710/63 |
| 5,696,993 | 12/1997 | Gavish | 710/12 |
| 5,715,410 | 2/1998 | Kim | 710/102 |
| 5,778,195 | 7/1998 | Gochi | 710/102 |
| 5,802,325 | 9/1998 | Le Roux | 710/101 |

FOREIGN PATENT DOCUMENTS

| | | | |
|---|---|---|---|
| 9309501 | 5/1993 | European Pat. Off. | G06F 13/00 |
| 9046470 | 2/1997 | Japan | H04N 1/00 |
| 9093376 | 4/1997 | Japan | H04N 1/00 |

*Primary Examiner*—Glenn A. Auve
*Assistant Examiner*—Ario Etienne
*Attorney, Agent, or Firm*—Majestic, Parsons, Siebert & Hsue

[57] ABSTRACT

A removable memory card interface apparatus enables a removable memory card to communicate with a number of peripheral devices directly without the need for the memory card's host or a host computer. The interface apparatus includes a micro-controller operating with an internal bus to control, process and route signals between the removable memory and a peripheral device via a series of memory and device interfaces. A control panel and/or remote control allows a user to interact with the interface apparatus. In one embodiment, the interface apparatus also allows a host computer to communicate with the memory card via one of the peripheral device ports. In other embodiments, the interface apparatus serves as a memory card printer controller or as a memory card player and/or recorder when interfaced with consumer electronics.

10 Claims, 4 Drawing Sheets

UNIVERSAL MEMORY CARD INTERFACE APPARATUS

FIELD OF THE INVENTION

The present invention relates to a computer interface apparatus and in particular to such apparatus that interfaces a memory card directly with a variety of peripherals without the need for a host system or to such apparatus that interfaces a memory card with a host system via a standard port of the host system not native to the memory card.

BACKGROUND OF THE INVENTION

Solid-state memory in the form of flash memory has recently become the storage of choice in a variety of mobile & handheld devices, notably information equipment and consumer electronics products. Unlike RAM (random access memory) which is also solid-state memory, flash memory is non-volatile which retains its stored data even after power is turned off. In spite of the higher cost, flash memory is increasingly being used in mass storage applications where information is stored semi-permanently in file format. Conventional mass storage, based on rotating magnetic media such as hard drives and floppy disks, is unsuitable for the mobile and handheld environment. This is because disk drives tend to be bulky, are prone to mechanical failure and have high power requirements. These undesirable attributes make disk-based storage impractical in most mobile and portable applications. On the other hand, flash memory is ideally suited in the mobile and handheld environment because of its small size, low power consumption, high speed and high reliability features.

While some of the early products have been using built-in flash memory chips, current products using flash memory are mostly in the form of a removable memory card. The removability feature has the added advantage of memory-capacity flexibility, reduced cost for the product itself, and portability and ease of information transfer from one host system to another.

One common usage of removable memory card is therefore in mobile computing such as laptop and palmtop computers, PDAs (personal digital assistants). In addition to providing application programs and data storage on these mobile hosts, the removable memory card provides a convenient way to exchange data and files between different hosts. For example, by moving the memory card from a mobile host to a desktop host, data in the field can be easily synchronized with that on the desktop. In the case of a limited-featured mobile host, the transferred data can be better manipulated on a full-featured desktop computer.

A common interface has been established for memory cards. It is known as the PC card standard or PCMCIA interface as specified by the Personal Computer Memory Card Interface Association. The standard establishes both the mechanical and electrical characteristics of the memory card interface. It is designed specifically for solid-state memory application although the interface has, since its inception a few years ago, been adapted to become a general purpose interface for card-based devices such as modems, network adapters and even hard drives. It has a size about that of a credit card and comes in Type I, II and III with increasing thickness from a couple of millimeters to several millimeters. There is a 68-pin socket on one card edge for mating with a connector located on a PC card slot of a host device. While PC card slots have become standard equipment on laptop and notebook computers, they have hardly been deployed on desktop personal computers (PCS). Thus, for a desktop computer to communicate directly with a PC card, a PC card slot must first be installed.

Currently, there are two main flash memory architectures that conform to the PC card standard, namely ATA flash and Linear flash.

ATA flash, with its 512 bytes flash sector architecture, mimics the DOS file structure of an ATA (Advanced Technology Attachment, i.e., one that communicates with a standard PC ISA bus) hard drive. In addition, the memory operation is under the control of a dedicated intelligent memory controller which also handles defect management and memory optimization. To a PC running DOS and MS Windows(R) operating system, a card with an ATA controller appears like another disk drive. This means that, under the standard Card and Socket Service drivers included with Windows 95(R), no additional software is needed to use ATA flash.

Linear flash on the other hand does not require to work with a dedicated memory controller. Typically, it relies on the intelligence and processing power of the host computer to handle the memory operations. It stores and communicates data in large blocks each having a size much larger than the DOS disk sector of 512 bytes. Its address space can be compatible with that of the system memory and could be seen as an extension of system RAM or ROM. Thus, it is possible to execute application programs directly from it rather than having to first load the application program into the system memory. When used as mass storage, Linear flash requires a software layer to translate data in blocks form to the file format of the operating system and vice versa. This software layer is called Flash File System (FFS). An alternative software layer is called Flash Translation Layer (FTL).

Thus, when plugged into a host PC system, some PC memory cards are immediately recognized as another disk drive while others require addition software and/or hardware to operate.

Removable memory card is also being incorporated into a new class of "smart" consumer electronics products. With products like smart cellular phones and pagers, the memory card is used to store data such as address book and personal information, or to record voice, e-mail, faxes, and pager messages, or to cache stock quotes and news feed. Again, the removable memory cards allow data to be portable between similar host devices and for the field data to be exchanged with that of the desktop computers.

With smaller handheld devices, the need arises for even smaller removable memory cards. A number of smaller form factor card standards have emerged. Three competing standards, namely CompactFlash, Miniature Card and SSFDC are being supported respectively by the CompactFlash Association (CFA), the Solid State Floppy Disk Card Group (SSFDC) and the Miniature Card Implementers Forum (MCIF). More recently, yet another card standard known as MultiMedia card (MMC) is being announced. All these cards are about postage stamp size with different electrical interfaces and slight difference in dimensions. Unlike one main PC card standard, there are then several smaller form factor card standards each specifying somewhat difference mechanical and electrical interfaces. A device or product will need a particular type of card slot for a particular type of smaller form factor card. However, most of the smaller form factor cards are provided with an adapter to conform to the PC card standard. Typically, the adapter is in the form of a Type II PC card for embedding the smaller form factor card into. In this way, they may be used in an existing PC card (PCMCIA) slot, possibly with addition software and hardware as required.

Removable memory card is rapidly entering the consumer marketplace because of widespread adoption by consumer electronics products such as digital cameras and digital audio recorders. The memory card replaces conventional photographic film or magnetic tape and provides virtually an unlimited amount of renewable recording media. For example, the memory card records image frames captured by a digital camera in the form of a compressed image file. A 4 MB flash memory card may hold approximately 40 frames (VGA resolution 640 by 480 pixels) at the rate of 100 KB per compressed file. When a card is filled up, a new or erased one could quickly replace it. The added advantage over conventional film is that the memory card could be erased and reused again and again when the existing data on it is no longer needed or has been archived to another storage.

Once the image files have been stored on the memory card, they can typically be called up frame by frame and displayed on a built-in small LCD screen provided on the camera. When hard copies of the recorded images are to be made, the camera sends its output to a specialized photo printer dedicated for this purpose. More common solutions have been to move the memory card into a desktop or a laptop host computer equipped with a slot for receiving such memory card. The image files can then be displayed on the computer with or without further manipulation before being printed on an attached standard printer.

Currently, a smaller form factor memory card may have a capacity as high as 40 MB and this capacity will be likely doubled with every new generation of flash memory devices. With this amount of capacity, it is a viable storage for multimedia information. Consumer products such as digital voice recorders and digital audio recorders will be able to record voice and audio information onto a removable memory card. Similar to the digital camera case, the recorded audio information on a memory card can be played back on its original host or on a desktop or laptop host.

Thus in most cases, the memory card is intended to be used in conjunction with its original host device or with a PC host that is equipped with a compatible card slot for receiving the card. However, because many of the applications have wide consumer appeal, it will be desirable to process, render and playback the information recorded on a memory card in a consumer environment instead of the original host or a PC host. Also, it will be desirable to record audio, video, and images from consumer electronics machines or from settop boxes for Internet access or from "thin" "network computers" (NC).

OBJECTS AND SUMMARY OF THE INVENTION

It is therefore a general object of the invention to provide an apparatus that interfaces a removable memory card directly with a variety of rendering devices without the need for the memory card's native host device nor a host personal computer.

It is another general object of the invention to provide an apparatus that interfaces a removable memory card with a standard port of a host computer not native to the removable memory card.

It is an object of the invention to provide a lowcost, easy-to-use memory card player that plays directly into existing consumer electronics such as television and audio equipment.

It is another object of the invention to provide a lowcost, easy-to-use memory card recorder that records audio and video information directly from existing consumer electronics such as television and audio equipment.

It is another object of the invention to provide a lowcost, easy-to-use memory card recorder that records multimedia information directly from settop boxes for Internet access and stripped-down "network computers."

It is another object of the invention to provide an apparatus that interfaces a removable memory card directly with a standard printer.

These and other objects of the invention are accomplished briefly by having an interface apparatus that is adapted to communicate with a removable memory on one hand and a plurality of peripheral devices on the other hand. The interface apparatus includes a micro-controller operating with an internal bus and includes one or more memory interface modules for translating a memory card's signals into that compatible with an internal bus. The interface apparatus also includes one or more device-specific interface modules for translating the device signals into corresponding internal bus compatible signals. In this way, the micro-controller is able to control and route any sets of signals on the internal bus between the memory card and a device in spite of the fact they employ different information formats and protocols.

According to one aspect of the invention, the interface apparatus includes a control panel and display for user interaction. In one embodiment, a remote control through an infrared port is provided as a remote extension of the control panel. Thus, the interface is easy to operate, much like that of the familiar consumer electronics.

According to another aspect of the invention, the interface apparatus supports a host mode operation in which one of the peripheral ports, such as the parallel port, is connectable to a host computer. In this way communication can be established between a memory card and the host computer even though the two do not have an interface in common.

The invention provides a flexible framework for implementing a removable memory card interface that is able to communicate with a variety of peripheral devices and even host computer. In its simplest embodiment, it can be a very low cost, dedicated player of digital images or audio files on consumer audio/video electronics. Alternatively, it can be a very low cost memory card interface for printing digital images directly to a standard printer. In a multi-feature embodiment, it can be a general purpose, multi-system memory card interface.

BRIEF DESCRIPTION OF THE DRAWINGS

The invention will now be described by way of example with reference to the drawings in which.

DETAILED DESCRIPTION OF THE PREFERRED EMBODIMENT

Figure 1A:
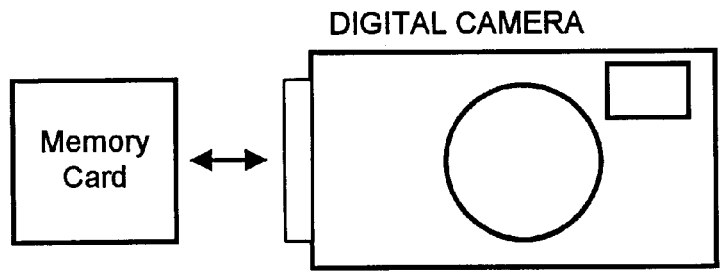
FIGS. 1A–1C illustrates the typical environment in which a removable memory card is used.
Figure 1B:
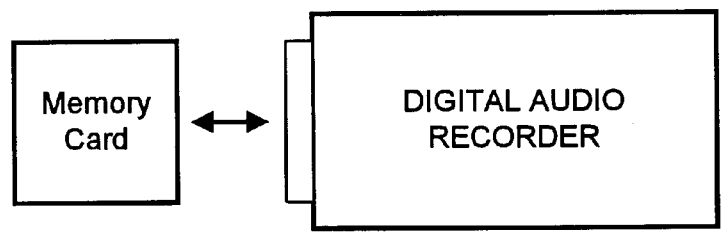
Figure 1C:
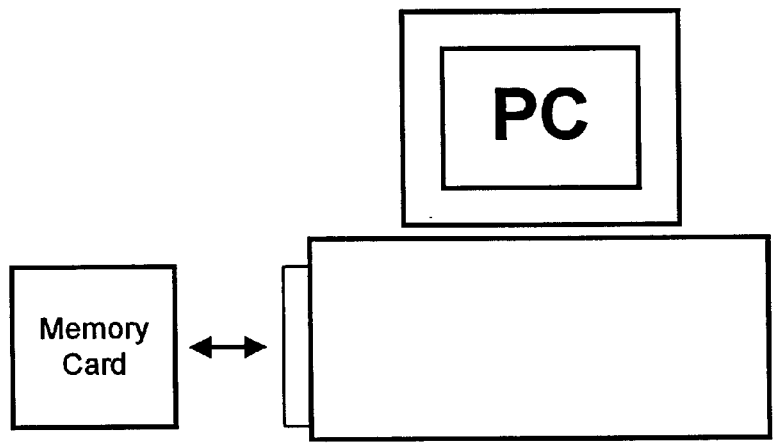

FIGS. 1A–1C illustrates the typical applications and operating environment in which a removable memory card is used. In particular, FIG. 1A illustrates a removable memory card being used with a digital still camera. The connection is by means of either a PCMCIA slot or one of the smaller form-factor card interfaces. FIG. 1B illustrates a removable memory card being used with a digital audio recorder. The audio recorder can be a voice recorder such as a dictation machine, or it can assume a form suitable for recording high-fidelity music. FIG. 1C illustrates a removable memory card being used with a laptop computer or a desktop personal computer by connection through a PC card (PCMCIA) interface installed thereon.

Figure 2:
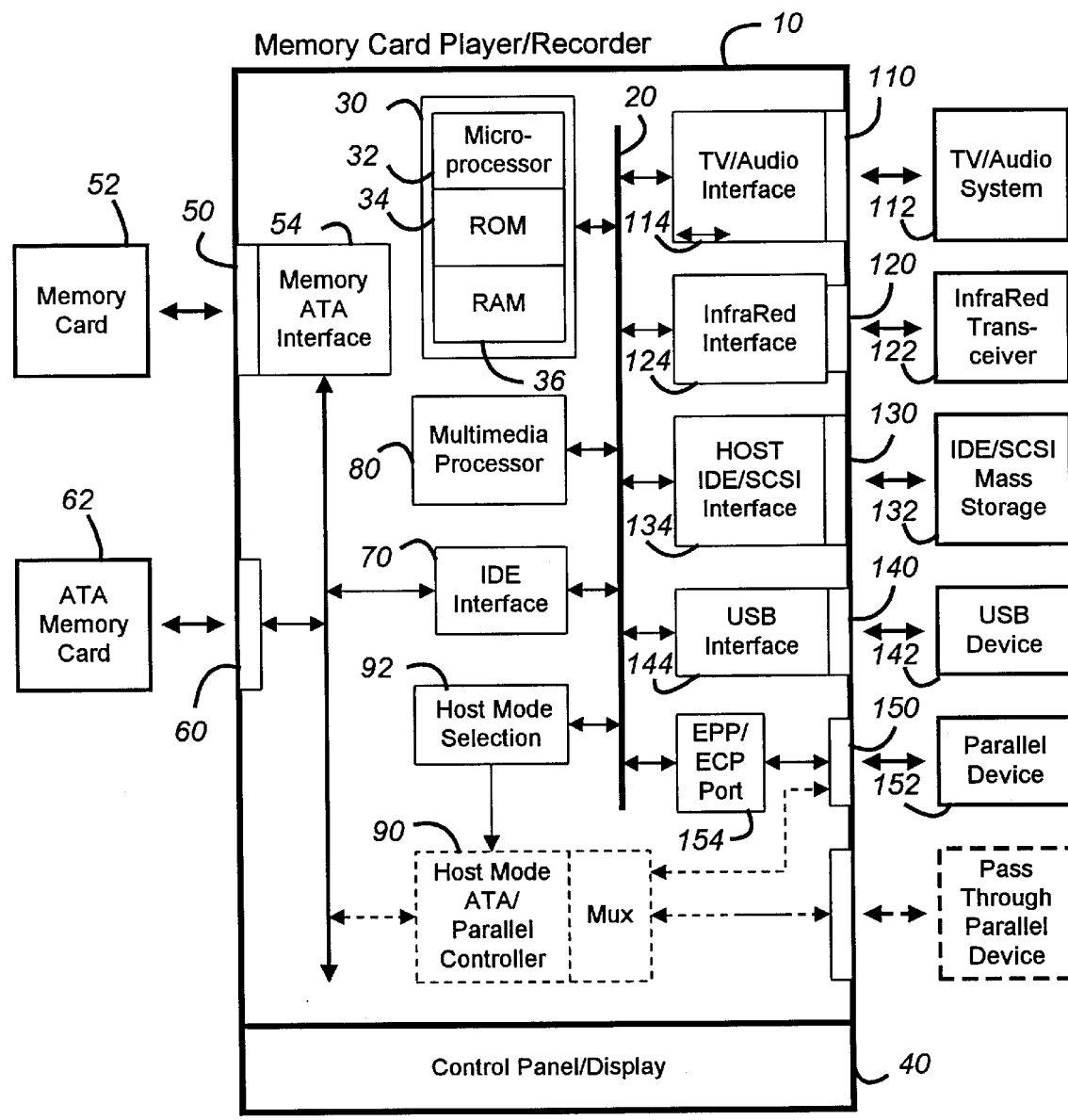
FIG. 2 is a schematic block diagram of the interface apparatus according to a general embodiment of the invention.

FIG. 2 is a schematic block diagram of the interface apparatus according to a general embodiment of the invention. Essentially, an interface apparatus 10 comprises a housing and mounted thereon is a set of memory card connectors for connection to one or more removable memory cards, and also a set of peripheral connectors for connection to one or more peripheral devices. An overall architecture is to convert the data format and protocol (signals) of each type of memories supported by the interface apparatus into a set of uniform signals on a backplane by means of an appropriate memory interface. Similarly, the signals of each peripheral device supported by the interface apparatus are converted by an appropriate peripheral interface into the same common set of uniform signals on the backplane. In this way, a micro-controller 30 can control, process and route any sets of signals on an internal bus 20 (or the backplane) even though the source and destination devices "speak" different signals. Thus, a memory card and a peripheral device are coupled together via a series of device interfaces communicating with each other through an internal bus 20.

The micro-controller 30 comprises a microprocessor 32, ROM 34 and RAM 36 all of which are in communication with the internal bus 20. In typical applications and configurations, a low cost microprocessor will suffice to handle data routing type of functionality. A more powerful microprocessor may be employed if the application calls for a substantial amount of data or signal processing, such as compression or decompression or rendering complex display or printer files. The micro-controller operates under a microcode or BIOS stored in ROM 34. The microcode can be updated via one of the memory ports or peripheral ports. Data transferred between a memory device and a peripheral device is buffered and cached in RAM 36.

A user interface is provided by a control panel/display 40 on the housing of the interface apparatus 10. The control panel/display is in communication with the internal bus 20 via an I/O interface (not shown). In the preferred embodiment, the control panel/display comprises buttons and LEDS and display similar to that found in consumer electronics. For example, some of the buttons may be similar to that of a VCR or a CD player which are useful for a user to navigate with when viewing images or listening to audio on a TV/Audio system. In one embodiment, depending on the command button pressed, the micro-controller transfers data/commands to or from a memory card. The display may have LEDS to display the status of the operation such as "Command Completed Successfully" or "Error Read the memory card" or "Peripheral Device Not Ready" or "Media full," etc. Alternatively, a LCD display may provide even more flexibility.

In one embodiment, the set of memory card connectors includes a connector 50 that conforms to the PCMCIA interface for receiving a Non-ATA flash PC card 52. A memory/ATA interface 54 is employed to convert the signals to be ATA compatible. As described in an earlier section, this is accomplished either by an additional software layer or by operating the memory in conjunction with a memory controller provided by the memory manufacturer as an embedded chipset. If the implementation is with an additional software layer, the software drivers can either reside in a memory of the Memory/ATA interface 54 or in ROM 34 or loaded into RAM 36. Once the signals are ATA compatible, they are coupled to the internal bus 20 via an IDE interface 70.

For those memory cards whose address space is an extension of the system memory space of the interface apparatus, they can be used to augment the ROM 34 or RAM 36. In some applications, an application program or applet may be supplied with or without the data on one of these removable memory cards and executed-in-place.

In one embodiment, the set of memory card connectors includes at least two memory connectors. One is connected to a first memory card with recorded data, and the other is connected to a second memory card with an application program. In this way, the application program on the second memory card can be executed-in-place to process the data from the first card.

In another embodiment, the set of memory card connectors includes a connector 60 that conforms to the PCMCIA interface for receiving an ATA flash PC card 62. In this case, since the flash memory is already ATA compatible, no additional processing need be done before coupling the signals to the internal bus 20 via an IDE interface 70.

In the case of smaller form factor flash memory cards, they can be connected to the appropriate PCMCIA connectors 50, 60 via an adapter as mentioned before.

In another embodiment, the same PCMCIA interface is provided to accept both ATA and non-ATA flash memory. Since media identification is incorporated into flash memory cards, internal logic (not explicitly shown) responsive to the sensed media type will process the signals accordingly by routing or not routing through the Memory/ATA interface 54.

On the peripheral end of the interface apparatus 10, the set of peripheral connectors depends on the specific need and application.

In one embodiment, the set of peripheral connectors includes a connector 110 that conforms to the video and audio input and output of a television and audio system 112. Typically, the graphics data on the memory card is in the form of standard compressed image files, such as JPEG files. Similarly in audio applications, the audio data is stored as well-defined compressed sound files. A multimedia processor 80 in communication with the internal bus 20 is employed to compress or decompress the various multimedia files. In the case of playing back a recorded multimedia file from a memory card, the compressed multimedia file is decompressed by the multimedia processor 80 before being converted by a TV/Audio interface 114 to standard TV and audio signals. The images from the memory card can then be displayed on the TV screen frame-by-frame by means of a user operating the control panel 40 or a remote control to be described later.

In the case of recording multimedia information from the TV/Audio system, the signals from the TV/Audio system are compressed by the multimedia processor 80 before being written to a memory card. The multimedia processor 80 as well as the TV/Audio interface 114 are readily implemented by commercially available sound, graphics, digital signal processing (DSP), audio and video ASIC chips.

Alternatively, the compression or decompression of the multimedia data may be accomplished by software in RAM 36 and executed by the microprocessor 32.

In another embodiment, the set of peripheral connectors includes a connector 120 that conforms to an infrared port which is connectable to an infrared transceiver 122. An infrared interface 124 converts the internal bus signals into that of the infrared transceiver. The infrared port may be used to communicate through the infrared transceiver 52 with other infrared enabled peripherals, such as printers and even host computers.

In a preferred embodiment, the infrared port or a similar additional one is used to implement a remote control with is an extension of the control panel 40.

In another embodiment, the set of peripheral connectors includes a connector 130 that conforms to an IDE (Integrated Device Electronics) port which is connectable to similar type of mass storage 132 such as a hard disk or a CD-ROM or a tape drive. An interface 134 serves as an IDE interface that translates signals between the internal bus 20 and the mass storage 132. Alternatively, the connector 60 may conform to a SCSI (Small Computer System Interface) port connectable to SCSI peripheral devices, in which case the interface 134 is a SCSI interface. The mass storage is useful in backing up the data from the memory card.

In another embodiment, the set of peripheral connectors includes a connector 140 that conforms to a USB (Universal Serial Bus) port which is connectable to a USB peripheral device 142. A USB interface 144 translates signals between the internal bus 20 and the USB peripheral device 142.

In another embodiment, the set of peripheral connectors includes a connector 150 that conforms to a PC parallel port which is connectable to a parallel peripheral 152 such as a printer or a mass storage using a parallel interface. A parallel interface 144 translates signals between the internal bus 20 and the parallel peripheral device 142.

In one application, the parallel peripheral device is a printer. Image files stored on a memory card are rendered by the multimedia processor 80 before being printed by the printer.

HOST MODE

While the interface apparatus is advantageously used to connect a memory card to a variety of peripheral device, it is also possible to connect a memory card to a host computer through the parallel connector 150. This allows a memory card to communicate with a host computer even when a PC card slot is absent.

Figure 3:
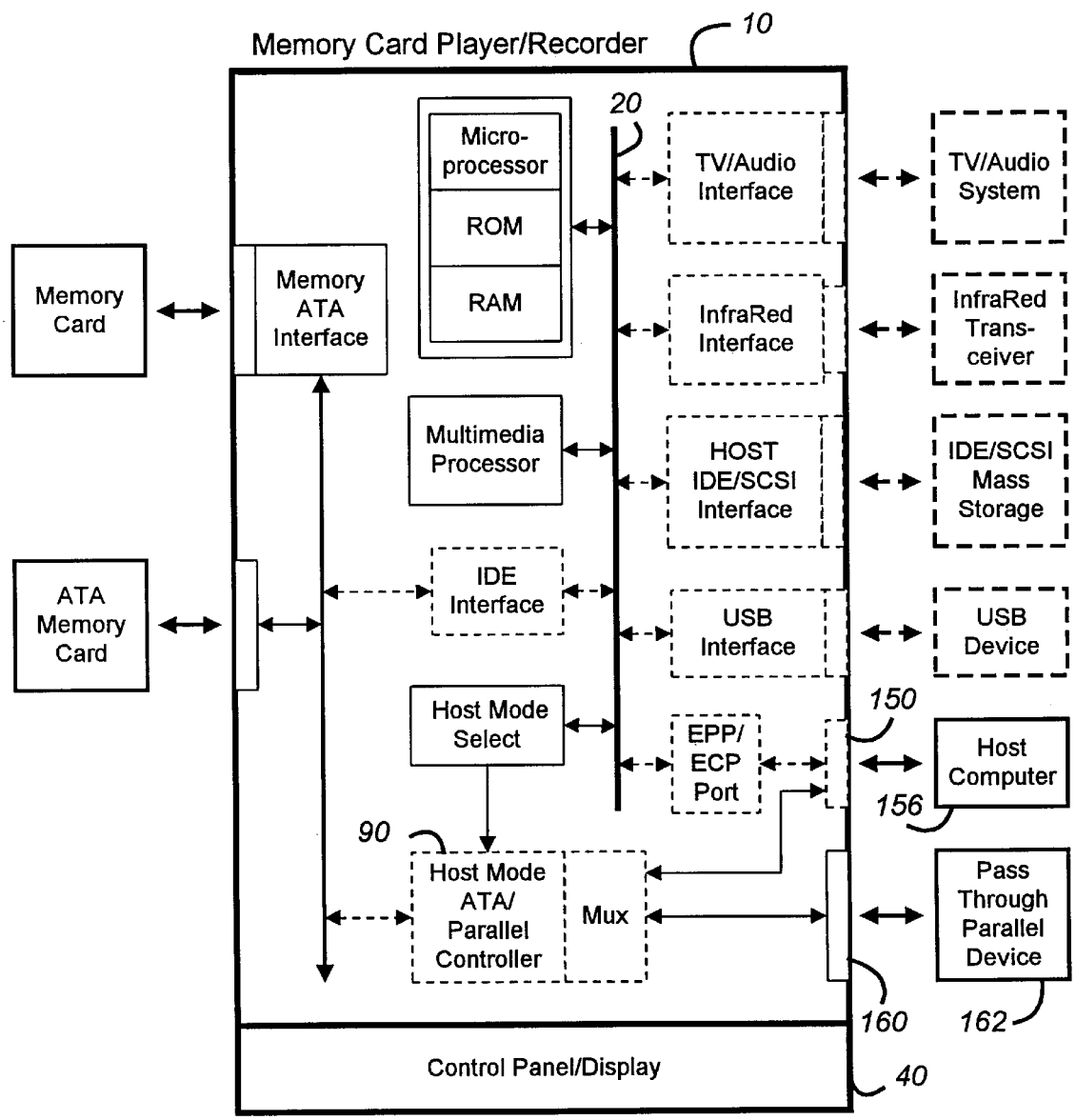
FIG. 3 is a schematic block diagram of the interface apparatus when operating in "Host Mode," in which a memory card is interfaced with a host computer through a parallel port thereof, according to a preferred embodiment of the invention.

FIG. 3 is a schematic block diagram of the interface apparatus 10 when operating in "Host Mode". In a preferred embodiment, the interface apparatus 10 includes a host mode, ATA/Parallel Controller 90. The dedicated controller essentially translates signals between ATA format and the parallel format. In this implementation, the memory card signals are translated into ATA compatible signals which in turn are translated to parallel signals at the connector 150 to which a host computer 156 is connected. A host mode select logic 92 in communication with the internal bus 20 is used to enable or disable the ATA/Parallel Controller 90. During operation, a user selects the host mode through the control panel 40. In response, the micro-controller 30 activates the select logic 92 which in term activates the ATA/Parallel Controller 90.

In the preferred embodiment, the set of peripheral connectors includes a connector 160 that conforms to another parallel port. This parallel connector 160 is to be used as a pass-through parallel port for connection to a pass-through parallel peripheral device 162. Typically, such a pass-through port is used to connect to a peripheral 162 that is normally connected to the host computer 156. However, since the host parallel port is already used up in connecting to the interface apparatus, the pass-through port provides a substitute parallel connection to the peripheral 162.

The ATA/Parallel Controller 90 with pass-through port support may be implemented by commercially available ASIC chips such as those available from Shuttle Technology Inc., Fremont, Calif., U.S.A.

Figure 4:
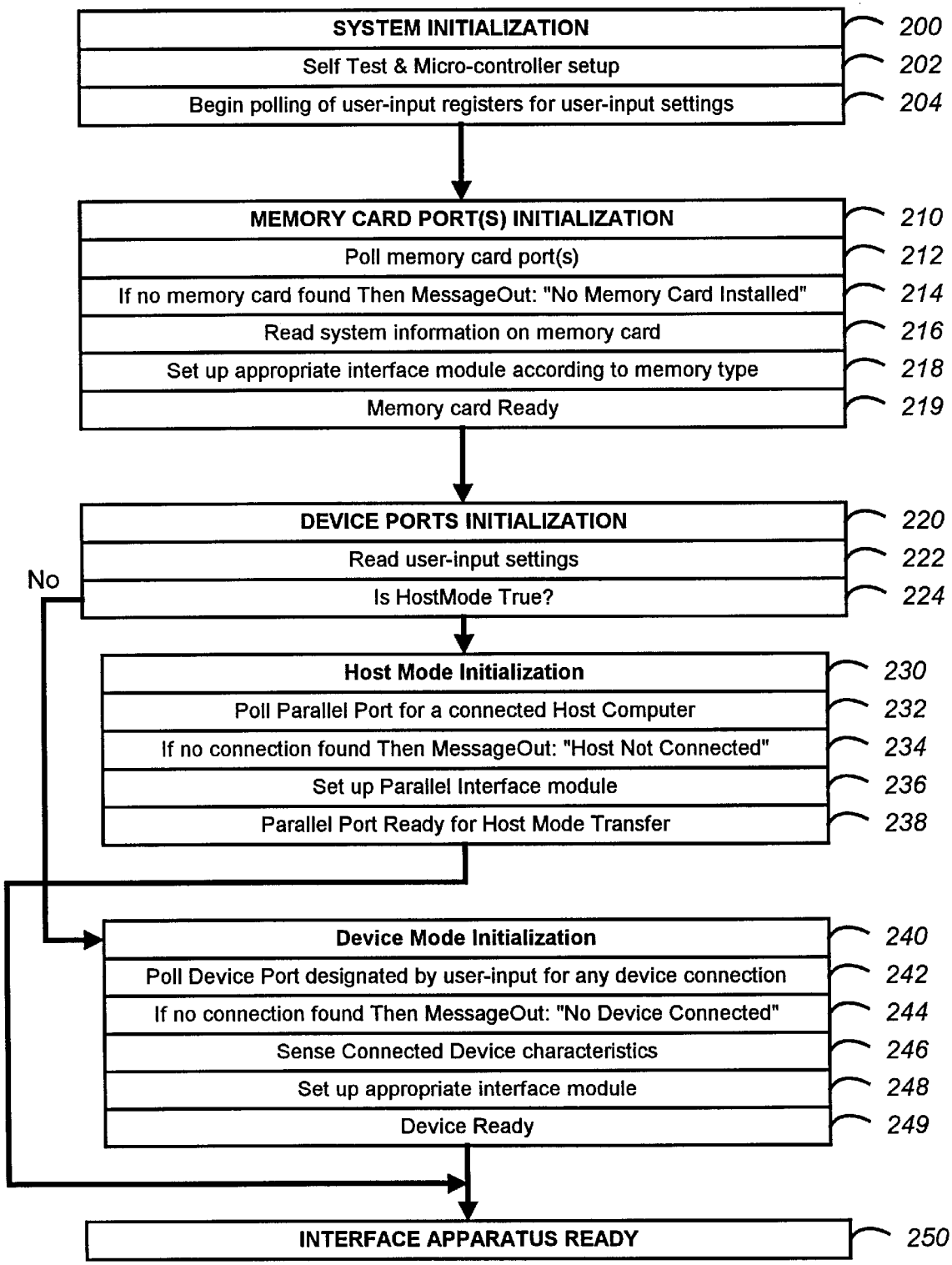
FIG. 4 is a flow diagram illustrating the operation of the interface apparatus shown in FIGS. 2 and 3, according to a preferred embodiment of the invention.

FIG. 4 is a flow diagram illustrating the operation of the interface apparatus shown in FIGS. 2 and 3, according to a preferred embodiment of the invention. Essentially, based on the user input settings, the sensed media and connection, and predefined logic, the interface apparatus sets up the appropriate interface modules, hardware and/or software to effect the interfacing operation.

The operations may be grouped into an initialization of the overall system, an initialization of the memory card port(s), and an initialization of the device ports, according to the following steps.

Step 200: system initialization begins.

Step 202: a self test is performed and the system BIOS and/or operating system takes control of the Micro-controller.

Step 204: the user-input settings are constantly monitored and responded to. Control proceeds to Step 210.

Step 210: memory card port(s) initialization begins.

Step 212: the memory card ports are sensed to detect the presence of a card.

Step 214: if no memory card is found, a status message, "No Memory Card Installed" is output. The system then goes into a recovery mode or abort mode depending if the error is rectified.

Step 216: if a memory card is found, its type is determined and its system information is read.

Step 218: the micro-controller sets up the memory interface module appropriate to the memory type.

Step 219: the memory card interface portion of the interface apparatus is now ready. Control proceeds to Step 220.

Step 220: device ports initialization begins Step 222: the Host mode choice is read from the user-input settings.

Step 224: if Host mode is not selected, then Device mode is, and control proceeds to Step 240. If Host mode is selected, control proceeds to Step 230.

Step 230: host mode initialization begins.

Step 232: the designated parallel port is checked for a host computer connection.

Step 234: if not host computer connection is found, a status message, "Host not connected" is output. The system then goes into a recovery mode or abort mode depending if the error is rectified.

Step 236: if a host computer is found in proper condition, the parallel interface module is activated.

Step 238: the parallel port is now ready for Host mode transfer. Control proceeds to Step 250 Step 240: Device mode initialization begins.

Step 242: the user-designated device port is sensed for the presence of a device connection.

Step 244: if no device connection is found, a status message, "No Device Connected" is output. The system then goes into a recovery mode or abort mode depending on whether the error is rectified.

Step 246: if a device connection is present, its characteristics are sensed.

Step 248: the device interface module associated with the port is activated.

Step 249: the device is now ready for communication. Control proceeds to Step 250.

Step 250: the interface apparatus is now ready for operation.

It will be appreciated from the above, therefore, a low cost, standalone memory card reader/recorder that is simple to use and flexible has been described. No host device, such as the memory card's native host, nor a general purpose personal computer, is required. Thus, the invention provides a particularly simple and effective solution to the problems stated in the introduction.

While the embodiments of the various aspects of the present invention that have been described are the preferred implementation, those skilled in the art will understand that variations thereof may also be possible. For example, while the host mode has been described in the preferred embodiment to employ a parallel port, other device ports such as the infrared port or the USB port are equally feasible. Similarly, while the memory ports have been described with respect to a PCMCIA interface, it is apparent that other established smaller form factor card interfaces are also possible. Therefore, the invention is entitled to protection within the full scope of the appended claims.

It is claimed:

1. A memory card interface apparatus comprising:
   an internal bus;
   an external memory connector for removably coupling to a memory card;
   a memory port connected to said external memory connector and coupled to said internal bus;
   a plurality of external device connectors, each for coupling to a device that operates with said memory card;
   a device port connected to each external memory connector and coupled to said internal bus;
   a control panel coupled to said internal bus for specifying an operation mode of the interface apparatus;
   a interface controller coupled to said internal bus and responsive to said control panel for enabling communication between said memory card and one or more devices coupled to said plurality of external device connectors.

2. A memory card interface apparatus as in 1, further comprising a parallel port coupled to said internal bus and to one of said plurality of external connectors, thereby supporting communication through a parallel port connection between said memory card and a peripheral device.

3. A memory card interface apparatus as in 1, further comprising a Universal Serial Bus interface coupled to said internal bus and to one of said plurality of external connectors, thereby supporting communication through an Universal Serial Bus connection between said memory card and a peripheral device.

4. A memory card interface apparatus as in 1, further comprising a mass storage to parallel interface coupled to said internal bus and to one of said plurality of external connectors, thereby supporting communication through a mass storage to parallel connection between said memory card and a mass storage device.

5. A memory card interface apparatus as in 4, wherein said mass storage to parallel interface includes an ATAPI interface.

6. A memory card interface apparatus as in 4, wherein said mass storage to parallel interface includes a SCSI interface.

7. A memory card interface apparatus as in 1, further comprising a television signal converter coupled to said internal bus and to one of said plurality of external connectors, thereby supporting communication through a parallel port connection between said memory card and a television.

8. A memory card interface apparatus as in 1, further comprising a sound signal converter coupled to said internal bus and to one of said plurality of external connectors, thereby supporting communication through a parallel port connection between said memory card and an audio device.

9. A memory card interface apparatus as in 1, further comprising a memory to ATAPI converter coupled to said internal bus, thereby supporting communication between said memory card and said interface controller through a ATAPI interface.

10. A memory card interface apparatus as in 1, wherein said device coupled to one of said plurality of external connectors includes a host computer, and said one of said plurality of external connectors includes a parallel interface.

* * * * *